United States Patent [19]

Eilenstein et al.

[11] Patent Number: 5,112,173

[45] Date of Patent: May 12, 1992

[54] LOCKING MECHANISM FOR LATCHING A CARGO PIECE TO A LOADING FLOOR

[75] Inventors: Wilfried Eilenstein, Stuhr; Guenter Vogg, Bremen, both of Fed. Rep. of Germany

[73] Assignee: Deutsche Airbus GmbH, Hamburg, Fed. Rep. of Germany

[21] Appl. No.: 634,466

[22] Filed: Dec. 27, 1990

[30] Foreign Application Priority Data

Dec. 27, 1989 [DE] Fed. Rep. of Germany ....... 3943077

[51] Int. Cl.⁵ .............................................. B65D 19/44
[52] U.S. Cl. ...................................... 410/79; 410/77; 410/92
[58] Field of Search .............. 105/463, 366 C; 410/52, 410/69, 70, 78, 77, 79, 90, 92; 244/118.1, 137 R; 292/113

[56] References Cited

U.S. PATENT DOCUMENTS

| | | | |
|---|---|---|---|
| 1,470,266 | 10/1923 | Kirchner | 410/77 X |
| 2,944,492 | 7/1960 | Clejan | 410/77 X |
| 3,262,588 | 7/1966 | Davidson | 410/79 X |
| 3,693,919 | 9/1972 | Alberti et al. | 410/92 X |
| 3,741,504 | 6/1973 | Alberti et al. | 410/92 X |
| 3,906,870 | 9/1975 | Alberti | 410/79 |
| 3,927,622 | 12/1975 | Voigt | 105/463 |
| 4,000,870 | 1/1977 | Davies | 410/78 X |
| 4,121,789 | 10/1978 | Lent et al. | 410/77 |
| 4,349,302 | 9/1982 | Ferguson | 410/79 X |
| 4,379,668 | 4/1983 | Pelletier | 410/77 |
| 4,583,896 | 4/1986 | Vogg et al. | 410/69 |

FOREIGN PATENT DOCUMENTS 675588 5/1939 Fed. Rep. of Germany ........ 410/77

Primary Examiner—Robert J. Spar
Assistant Examiner—Brian Dinicola
Attorney, Agent, or Firm—W. G. Fasse

[57] ABSTRACT

A locking mechanism for latching cargo pieces to a loading floor of aircraft has two latches housed in a common latch housing. The latching claws face in opposite directions. The latches rotate on journal shafts arranged parallel to the longitudinal axis of the aircraft with a lateral on-center spacing between the journal shafts. Tension springs act eccentrically to hold the latches in their extended locking position. In the locking position the latches support each other by bearing against respective stops. An inclined ramp, provided on each latch and extending in the loading direcion, cooperates with a connecting lever joint to assure that the latches can be rolled over by cargo pieces of full width, while pieces of half the full width are arrested in lateral and vertical directions when the mechanism is located between two pieces of half width closely spaced from each other.

6 Claims, 2 Drawing Sheets

LOCKING MECHANISM FOR LATCHING A CARGO PIECE TO A LOADING FLOOR

FIELD OF THE INVENTION

The invention relates to a locking mechanism for latching of cargo pieces to a loading floor, especially in an aircraft with at least one latch means which can be rolled over by the cargo piece when the cargo piece is moved within the cargo hold. The latch is pivoted or journalled in and can be recessed into a housing mounted in the loading floor. A spring which acts eccentrically relative to the journal axis of the latch, locks the latch into a locking or arresting position wherein the latch protrudes above the loading plane which is the top surface of the loading floor.

BACKGROUND INFORMATION

Such locking mechanisms are being used in freight loading systems as so-called YZ-latches and serve to fix or lock cargo pieces such as containers or pallettes in the lateral and vertical direction of their stowed position. For this purpose the latches reach over appropriate projections on the cargo pieces. A frequent requirement for such locking mechanisms which extend out above the loading floor is, that the mechanisms can be rolled over when the freight is transported in one direction, and that the latches hold and lock the cargo pieces in another direction.

German Patent Publication (DE-PS) 3,222,202, corresponding to U.S. Pat. No. 4,583,896 (Vogg et al.) discloses a locking mechanism as described above. The known mechanism is pushed below the plane of the loading floor when a piece of freight rolls over the mechanism from a direction opposite to the direction in which the latch claw faces. The latch claw is returned to its initial position by the power of a tension spring after the roll over, and in the other direction locks the cargo pieces or respectively requires an unlocking action.

In connection with the YZ-latches mentioned above, which act on the sides of the cargo pieces, the various widths of the freight pieces create a problem. In different sections of the hold there are frequently loaded containers or pallettes with a width of 125 inches as well as some with a width of only 62 inches. The latter are placed next to each other in the space provided for 125 inch wide pieces, so that only a lateral space of one inch remains between the pieces.

U.S. Pat. No. 3,927,622 (Voigt) describes a freight lashing apparatus, especially for aircraft, in which freight movement sensing bails are responsive to freight movements forward, and in both lateral directions for retracting the locking mechanism. Additionally, an unlocking device is responsive to freight movements in a direction reverse to the forward direction. Thus, the known mechanism can be retracted into a recess below the loading floor level in response to forward, backward and lateral right and left freight movements. The latches are arrested in the working position. The latch claw is effective in but one direction for locking or arresting a cargo piece in a stowed position.

OBJECTS OF THE INVENTION

In view of the above it is the aim of the invention to achieve the following objects singly or in combination:

to construct a locking mechanism of the type described above in such a way that on the one hand, wide cargo pieces can roll over the locking mechanism in the direction parallel to the longitudinal axis of an aircraft, and that on the other hand, an automatic lateral and vertical locking or arresting for cargo pieces of half the standard width is assured in the one inch space remaining between the two smaller pieces when they are arranged laterally next to each other with respect to the longitudinal axis;

to assure that tension springs bias the latches into a cargo holding position or into a recessed position below the loading floor; and to assure that the two latches remain in parallel to each other in the retracted and in the extended position.

SUMMARY OF THE INVENTION

According to the invention a locking mechanism for arresting pieces of cargo on a floor of a cargo hold in an aircraft is characterized in that two latches are journalled on two parallel journal shafts mounted in a housing with a lateral spacing from one another and so that respective latching claws face in opposite directions extending approximately perpendicularly across the loading direction of cargo pieces, that each latch is provided with a ramp member extending in parallel to the journal shafts and having an inclined run-up surface arranged so that each ramp on the respective ramp member slants in a direction opposite to the slanting direction of the other ramp, and that the latches are linked together by a lever joint (23, 24) which acts eccentrically relative to the journal shafts.

BRIEF DESCRIPTION OF THE DRAWINGS

In order that the invention may be clearly understood, it will now be described, by way of example, with reference to the accompanying drawings, wherein.

Figure 1:
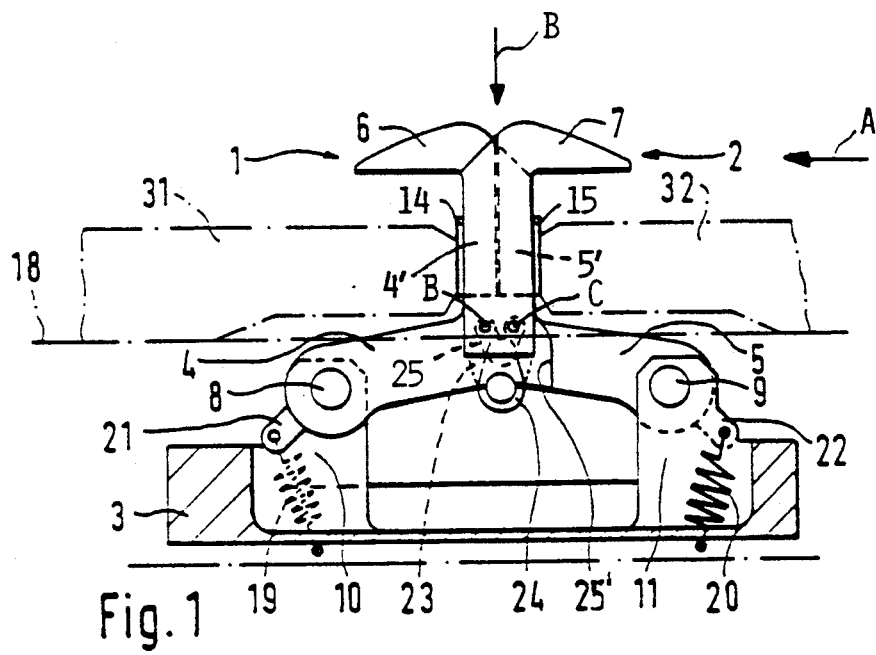
FIG. 1 is a side view, partly in section, of a locking mechanism according to the invention with two oppositely facing locking latches tilted into the locking position.

DETAILED DESCRIPTION OF PREFERRED EXAMPLE EMBODIMENTS AND OF THE BEST MODE OF THE INVENTION

The locking mechanism shown in FIGS. 1 to 4 comprises a first locking latch 1 and a second locking latch arranged in a housing 3. Each of the latches 1 and 2 has an angle or bellcrank type lever 4, 5 respectively. Each latch 1, 2 has a latching claw 6, 7 at its upper end and a mounting hole at its lower end. The bellcrank levers 4, 5 are mounted or rather journalled on respective journal bolts or shafts 8 and 9 each passing through its mounting hole. The journal shafts are spaced from each other and extend in parallel to each other in such a way that the latching claws 6 and 7 can face in opposite directions. The journal shafts 8 and 9 of the latches 1 and 2 are mounted in bearing or support blocks 10 and 11 respectively, which are integrated in the housing 3. The on-center spacing between the parallel journal shafts 8, 9 corresponds to approximately twice the length of the bellcrank lever arms which are journalled to these shafts. Additionally, the support blocks 10 and 11 are offset or staggered relative to each other by an amount which roughly corresponds to the width of the bell-crank levers 4 and 5, whereby the offset extends in the direction parallel to the journal shafts.

Figure 2:
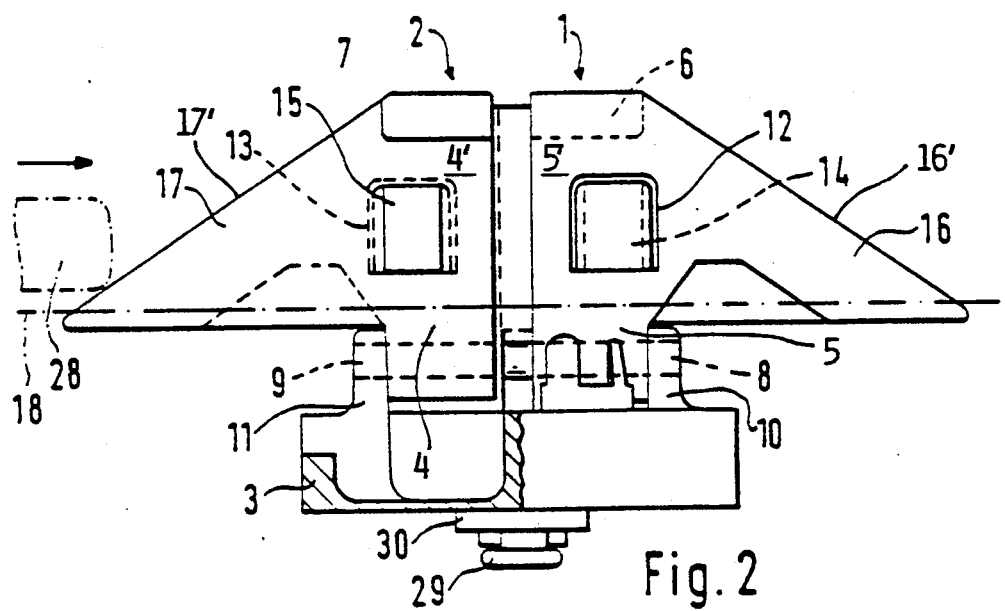
FIG. 2 is a view of the present locking mechanism in the direction of arrow A shown in FIG. 1.
Figure 3:
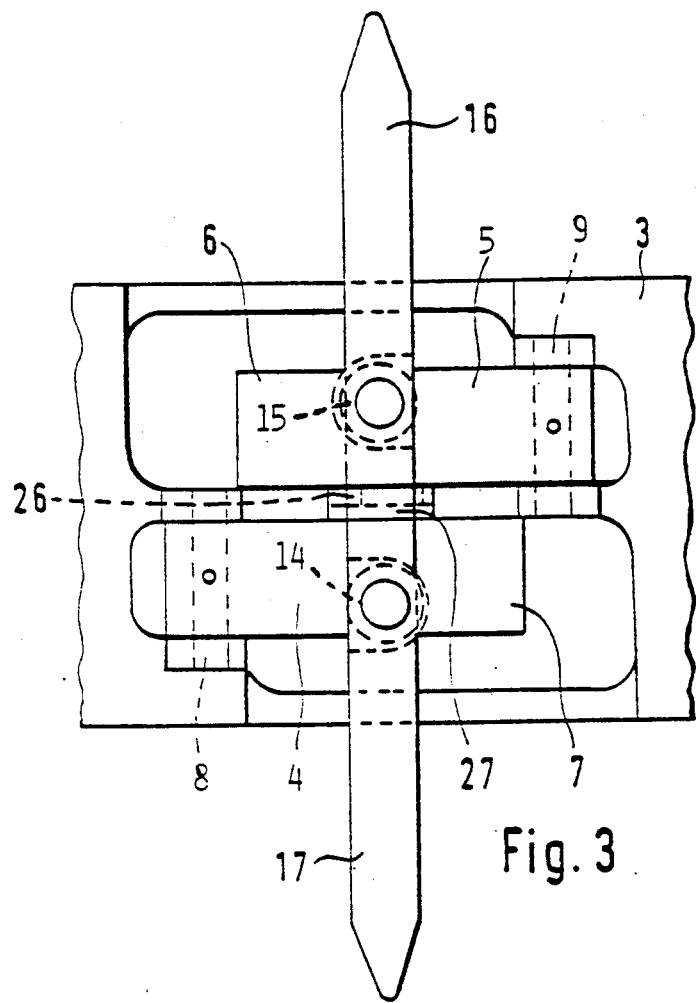
FIG. 3 shows a top view of the present locking mechanism in the direction of arrow B shown in FIG. 1.

Thus, in the extended or latching position of the locking latches 1 and 2, as shown in FIGS. 1 to 3, there is a small side-to-side spacing between the bellcrank lever arms 4', 5' which carry the latching claws 6 and 7, respectively.

These lever arms 4', 5' which stand approximately vertical in the extended position of the latches 1 and 2, are each provided with an opening 12, 13 in which a roller 14, 15 is arranged to rotate about a vertical axis. Furthermore, each lever arm has, as an integral piece, a lateral projection 16, 17 in the form of a right-angled triangle. In the extended position of the latches 1 and 2, as shown in FIGS. 1 to 3, these triangles stand approximately vertically with their hypotenuse forming an acute angle with the loading plane 18. The projections 16, 17 are arranged on the bellcrank levers 4, 5 in such a way that they extend in parallel to the axes of the journal shafts 8, 9, but in opposite directions relative to each other.

Tension springs 19, 20 are provided to pull the latches 1, 2 into the locking position, shown in FIGS. 1 to 3. The tension springs 19, 20 act through levers 21 and 22 respectively, eccentrically on the bellcrank levers 4, 5 for holding the bellcrank levers 4, 5 in a cargo locking position. In addition, the center parts of the bellcrank levers 4, 5 are coupled to each other by a lever or link joint 23, 24. The link joint comprises two links 23 and 24 journalled to each other at A. The link 23 is journalled to the bellcrank lever 4 at B. The link 24 is journalled to the bellcrank lever 5 at C. A stop edge 25 on bellcrank lever 5 and a stop edge 25' on bellcrank lever 5 cooperate in forming a guide channel between the stop edges 25, 25'. The movement of the levers or links 23, 24 limited between the stop edges 25, 25' to prevent a sideways excursion of the levers or links 23, 24 when the latches 1, 2 are moved into and out of the retracted position of FIG. 4. Further as shown in FIG. 3, the bellcrank levers 4, 5 are provided with stop surfaces 26, 27 on their surfaces facing each other so that the latches 1, 2 support each other in their extended cargo holding position of FIGS. 1 to 3 and are held together in that position by the tension springs 19 and 20.

As can best be seen from FIG. 2, part of the locking mechanism including the housing 3, is recessed into the loading floor 18 of an aircraft in such a manner that the inclined run-up or ramp surfaces 16', 17' of the projections 16, 17 face substantially in the direction of movement of a piece 28, namely in the direction of the longitudinal axis of the aircraft. The housing 3 is locked by quick-fasteners 29 to rails 30 provided in the floor of the cargo hold. If the freight consists of two half width cargo pieces 31, 32 to be transported side-by-side, each piece being 62 inches wide, these pieces will be held in their stowing position by the latching claws 6 and 7 in the vertical direction or "Z-direction" and by the rollers 14, 15 respectively in the lateral direction or "Y-direction". The diameter of the rollers 14 and 15 is chosen, so that it corresponds to the remaining free lateral space between the two cargo pieces of approximately one inch.

Figure 4:
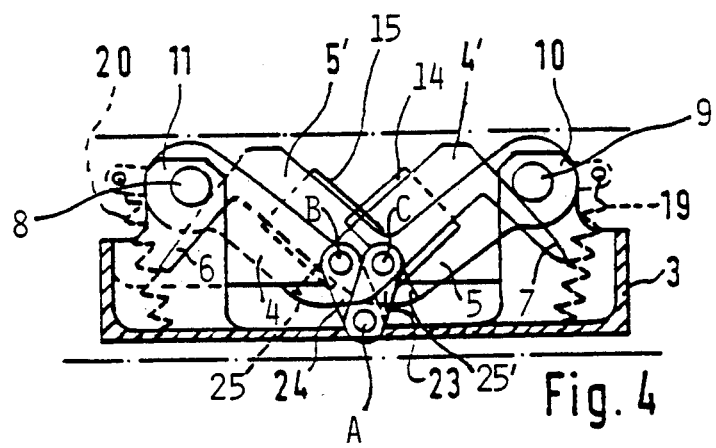
FIG. 4 shows the present locking mechanism in a view similar to FIG. 1, however, with the latches in a retracted position.

However, when a cargo piece of full width as shown in FIG. 2, in this case 125 inches, is to be loaded the latch 2 next to the cargo piece will be depressed as soon as the wide cargo piece reaches the ramp surface 17'. The second latch 1 will also be moved down through the lever joint 23, 24. As long as the cargo piece remains over the locking mechanism the retracted position of the mechanism shown in FIG. 4 is retained. When the cargo freight has rolled beyond the latches 1, 2, the latter return to their extended locking positions under the action of the tension springs 19, 20.

Although the invention has been described with reference to specific example embodiments, it will be appreciated, that it is intended to cover all modifications and equivalents within the scope of the appended claims.

What is claimed is:

1. A locking mechanism for latching cargo pieces to a loadng floor, comprising a housing, first and second journal shafts mounted in said housing in parallel to each other and with a fixed spacing between said journal shafts, a first latch journalled to said first journal shaft, a second latch journalled to said second journal shaft, each of said latches having a latching claw, one latching claw facing in a first direction, the other latching claw facing in a second opposite direction when said first and second latching claws are in a cargo latching position, said latching claws extending approximately perpendicularly to a cargo moving direction, each latch comprising a ramp member having a ramp surface arranged so that both ramp surfaces are slanting in opposite directions relative to each other, coupling means forming a link lever joint for interconnecting said first and second latches with each other, said lever joint being connected to said first and second latches eccentrically of said journal shafts, and spring means connected between said housing and said first and second latches for biasing said first and second latches.

2. The locking mechanism of claim 1, further comprising a recess in each of said first and second latches, a journal axis in each recess, a roller mounted for rotation about is journal axis in its recess, said journal axis extending substantially vertically if said first and second latching claws are in said cargo latching position.

3. The locking mechanism of claim 2, wherein said roller is positioned at a level defined by a bottom of a cargo piece when said two latches are in a locking position above said loading floor.

4. The locking mechanism of claim 1, wherein each of said two latches comprises a stop located in such positions that both stops engage each other when said two latches are in a position above said loading floor.

5. The locking mechanism of claim 1, wherein each of said two latches comprises a guide track for said coupling means forming said lever joint, to keep said coupling means in an operating position at all times.

6. The locking mechanism of claim 1, wherein said coupling means comprise a first coupling link (23) journalled to said first latch (4), a second coupling link (24) journalled to said second latch (5), and a journal connection (A) between said first and second coupling links for moving said first and second latches in unison.

* * * * *